(12) United States Patent
Uemori et al.

(10) Patent No.: US 11,592,043 B2
(45) Date of Patent: Feb. 28, 2023

(54) CLAMP UNIT AND CLAMP DEVICE

(71) Applicant: NABEYA BI-TECH KABUSHIKI KAISHA, Seki (JP)

(72) Inventors: Kenji Uemori, Seki (JP); Hirofumi Mitsui, Seki (JP)

(73) Assignee: NABEYA BI-TECH KABUSHIKI KAISHA, Gifu-Ken (JP)

( * ) Notice: Subject to any disclaimer, the term of this patent is extended or adjusted under 35 U.S.C. 154(b) by 105 days.

(21) Appl. No.: 17/056,916

(22) PCT Filed: Dec. 10, 2019

(86) PCT No.: PCT/JP2019/048172
§ 371 (c)(1),
(2) Date: Nov. 19, 2020

(87) PCT Pub. No.: WO2020/122035
PCT Pub. Date: Jun. 18, 2020

(65) Prior Publication Data
US 2021/0207632 A1    Jul. 8, 2021

(30) Foreign Application Priority Data
Dec. 14, 2018   (JP) .............................. JP2018-234180

(51) Int. Cl.
*F16B 2/14* (2006.01)
*F16B 2/16* (2006.01)

(52) U.S. Cl.
CPC .................. *F16B 2/14* (2013.01); *F16B 2/16* (2013.01); *Y10T 403/591* (2015.01); *Y10T 403/599* (2015.01); *Y10T 403/7066* (2015.01)

(58) Field of Classification Search
CPC ...... F16B 2/14; F16B 2/16; F16B 7/14; F16B 7/1409; F16B 7/149; Y10T 403/32483;
(Continued)

(56) References Cited

U.S. PATENT DOCUMENTS 2,954,638 A * 10/1960 Motter ...................... F16B 2/14
403/319
3,491,614 A * 1/1970 Demske ................. B62D 1/192
403/325
(Continued)

FOREIGN PATENT DOCUMENTS

DE          10140561 A1 *  2/2003  ............ F16B 7/1409
DE      102005040811 A1 *  3/2007  ............... F16B 2/14
(Continued)

*Primary Examiner* — Josh Skroupa
(74) *Attorney, Agent, or Firm* — Tarolli, Sundheim, Covell & Tummino LLP

(57) ABSTRACT

A clamping unit includes a case with a contact surface, an operation member arranged movable in a pressing cancellation direction and a pressing promotion direction relative to the case, a pressing body arranged in a movable manner in the case to oppose the contact surface, and a movable body between the pressing body and contact surface. At least one of the contact surface, movable body, and pressing body includes an inclined surface. The inclined surface increases a protruding amount of the pressing body from the case when the movable body changes in position as the operation member moves in the pressing promotion direction and eases pressing of the movable body against the pressing body when the movable body changes in position as the operation member moves in the pressing cancellation direction to permit a decrease in the protruding amount of the pressing body from the case.

8 Claims, 10 Drawing Sheets

(58) Field of Classification Search
CPC ......... Y10T 403/32501; Y10T 403/591; Y10T 403/599; Y10T 403/7051; Y10T 403/7052; Y10T 403/7064; Y10T 403/7066
See application file for complete search history.

(56) References Cited

U.S. PATENT DOCUMENTS

| | | | | |
|---|---|---|---|---|
| 3,941,492 | A * | 3/1976 | Meinunger | F16B 7/1409 403/380 |
| 4,278,224 | A * | 7/1981 | Arakawa | F16B 2/14 248/246 |
| 4,577,732 | A * | 3/1986 | Gottling | F16B 7/1409 92/24 |
| 4,900,182 | A * | 2/1990 | Stillwagon | F16B 7/1409 403/325 |
| 6,186,047 | B1 * | 2/2001 | Baruffaldi | F15B 15/262 92/24 |
| 8,453,990 | B2 * | 6/2013 | Lee | F16B 9/056 403/165 |
| 9,220,346 | B1 * | 12/2015 | Wu | A47C 7/5064 |
| 2013/0028546 | A1 | 1/2013 | Wako et al. | |
| 2014/0069748 | A1 | 3/2014 | Wako et al. | |
| 2014/0131145 | A1 | 5/2014 | Wako et al. | |

FOREIGN PATENT DOCUMENTS

| | | | | |
|---|---|---|---|---|
| DE | 102012014754 | A1 * | 1/2014 | ............ F16G 11/108 |
| FR | 2702809 | A1 * | 9/1994 | ............ F16B 7/1409 |
| JP | 2014066365 | A | 4/2014 | |

* cited by examiner

CLAMP UNIT AND CLAMP DEVICE

RELATED APPLICATIONS

The present invention is a U.S. National Stage under 35 USC 371 patent application, claiming priority to Serial No. PCT/JP2019/048172, filed on 10 Dec. 2019; which claims priority of JP 2018/234180, filed on 14 Dec. 2018, the entirety of both of which are incorporated herein by reference.

TECHNICAL FIELD

The present disclosure relates to a clamping unit and clamping device.

BACKGROUND ART

Patent Document 1 discloses a clamping device that clamps the shaft of, for example, a pipe. The clamping device disclosed in Patent Document 1 includes a stopper body with a through-hole of which the cross-section is circular. The stopper body is mountable on the shaft, through which the through-hole is inserted, in an attachable and detachable manner. The inner surface of the through-hole includes an inclined surface that defines a wedge-shaped space, which gradually decreases in diameter in an extending direction of the shaft.

The through-hole internally includes a holder. The holder centrally includes an insertion hole, through which the shaft is inserted, and holds rolling elements such as balls or rollers. Further, the through-hole internally includes a spring that presses the holder in a direction in which the diameter of the wedge-shaped space decreases.

Additionally, the clamping device includes a rolling element release means such as a lever. The rolling element release means moves the holder in a direction in which the diameter of the wedge-shaped space increases.

When the spring presses and moves the holder in the direction in which the diameter of the wedge-shaped space decreases, the surface of the shaft and the inclined surface press and contact the rolling elements. As a result, the shaft is clamped.

PRIOR ART DOCUMENTS

Patent Documents

Patent Document 1: Japanese Laid-Open Patent Publication No. 2014-66365

SUMMARY OF THE INVENTION

Problems that the Invention is to Solve

In the above-described clamping device, components in different sizes need to be prepared according to the size of the shaft as the stopper body, the holder, and the rolling elements held by the holder. This increases the cost.

It is an object of the present disclosure to provide a clamping device and a clamping unit capable of reducing the number of components by commonizing the clamping unit even if the diameters of clamping targets are different and thus capable of lowering the cost.

Means for Solving the Problems

A clamping unit according to an aspect of the present disclosure includes a case with a contact surface, an operation member arranged in the case such that the operation member is movable back and forth in a pressing cancellation direction and a pressing promotion direction relative to the case, a pressing body arranged so as to oppose the contact surface, the pressing body being arranged in the case in a movable manner such that a protruding amount of the pressing body from a side part of the case is changeable, a movable body arranged between the pressing body and the contact surface in contact with the pressing body and the contact surface, the movable body being configured to move along the pressing body and the contact surface as the operation member moves in each of the pressing cancellation direction and the pressing promotion direction, and a first biasing member that biases the operation member in the pressing promotion direction. At least one of the contact surface, a portion of the movable body in contact with the contact surface, a portion of the movable body in contact with the pressing body, or a portion of the pressing body in contact with the movable body includes an inclined surface inclined with respect to the pressing cancellation direction and the pressing promotion direction. The inclined surface is configured to increase the protruding amount of the pressing body from the case when the movable body changes in position as the operation member moves in the pressing promotion direction and ease pressing of the movable body against the pressing body when the movable body changes in position as the operation member moves in the pressing cancellation direction, so that a decrease in the protruding amount of the pressing body from the case is permitted. The case includes an attachment portion and is configured to be attached to a bracket at the attachment portion, a clamping target being insertable into the bracket.

In addition, a clamping device according to an aspect of the present disclosure includes the clamping unit and a bracket including an insertion portion and a connection portion, a clamping target being insertable into the insertion portion, the connection portion connecting to the insertion portion in a direction intersecting an extending direction of the insertion portion, the pressing body capable of entering the connection portion. The clamping unit is attached to the bracket at the attachment portion.

MODES FOR CARRYING OUT THE INVENTION

First Embodiment

A clamping device 10 and a clamping unit 30 according to an embodiment will now be described with reference to FIGS. 1 to 9.

Figure 1:
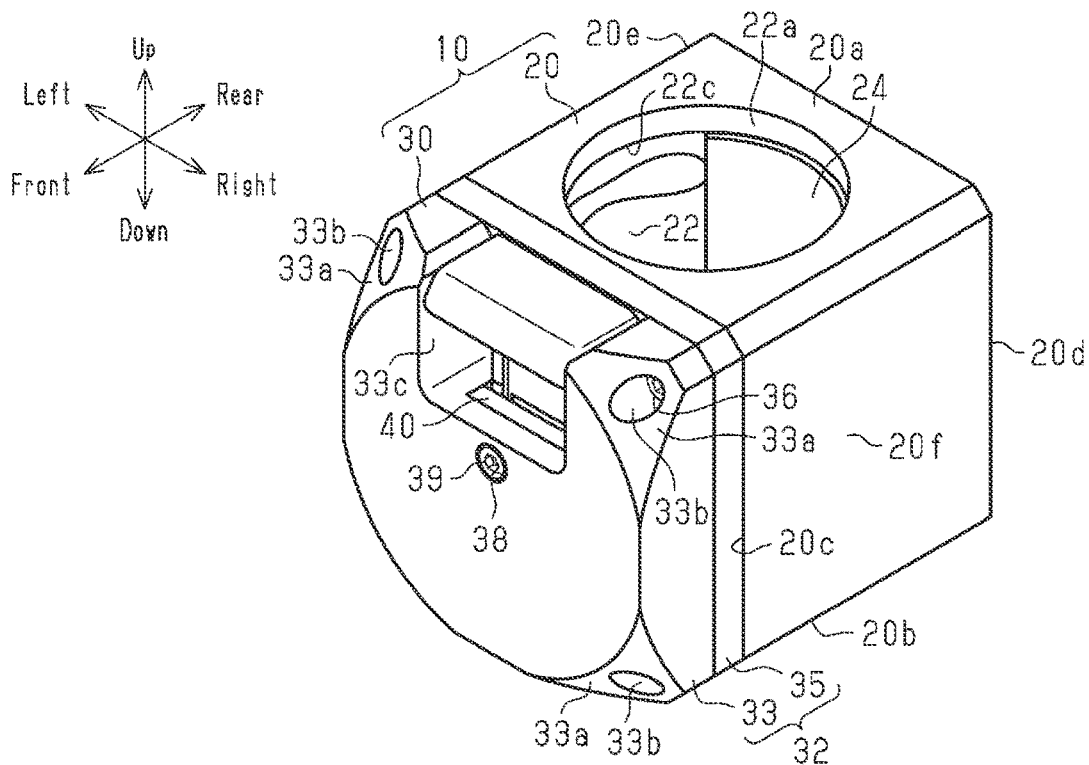
FIG. 1 is a perspective view of a clamping unit and a clamping device according to a first embodiment.

To facilitate understanding, as shown in FIG. 1, up, down, left, right, front, and rear are defined with reference to FIG. 1.

Figure 3:
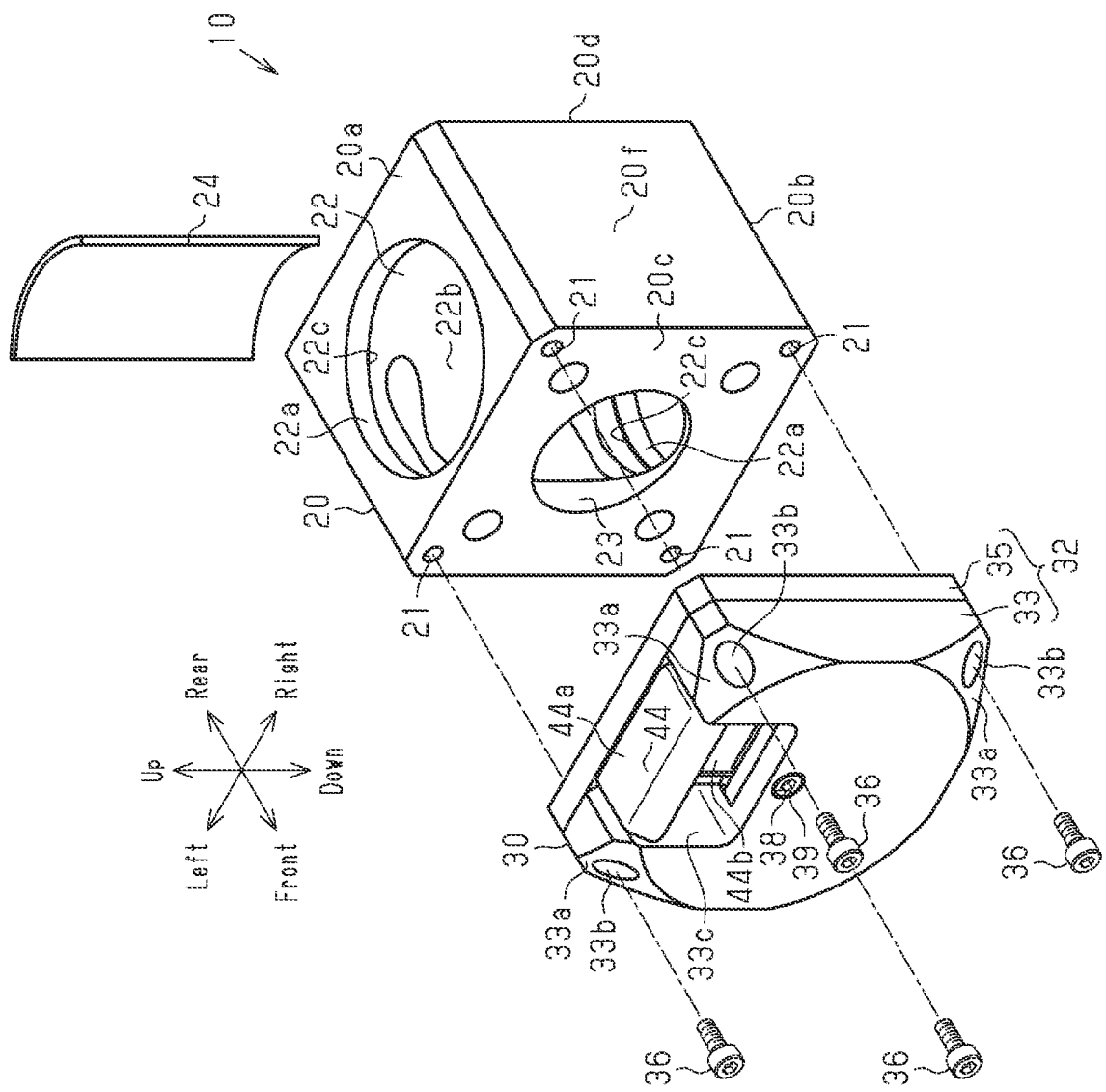
FIG. 3 is an exploded perspective view of the clamping device in FIG. 1.

As shown in FIGS. 1 and 3, the clamping device 10 includes a bracket 20 and the clamping unit 30, which is fixed to the bracket 20. The components of the bracket 20 and the clamping unit 30 are made of metal unless otherwise indicated, and do not have to be made of metal.

The shape of the bracket 20 is substantially cubic. The bracket 20 includes six faces 20a to 20f. The first face 20a and the second face 20b (lower face), which are arranged on opposite sides, are arranged perpendicularly to the third face 20c (front face) and the fourth face 20d (rear face), which are arranged on opposite sides in the same manner, and the fifth face 20e (left face) and the sixth face 20f, which are arranged on opposite sides in the same manner. Further, the third face 20c and the fourth face 20d are arranged perpendicularly to the fifth face 20e and the sixth face 20f.

As shown in FIGS. 1 and 3, the bracket 20 includes a through-hole 22, which extends from the first face 20a to the second face 20b and has a circular cross-section. As shown in FIG. 3, the third face 20c of the bracket 20 includes a connection hole 23, which intersects the through-hole 22 extending in the up-down direction and connects to the through-hole 22. The through-hole 22 is an example of an insertion portion or an insertion hole. The connection hole 23 is an example of a connection portion.

Figure 2:
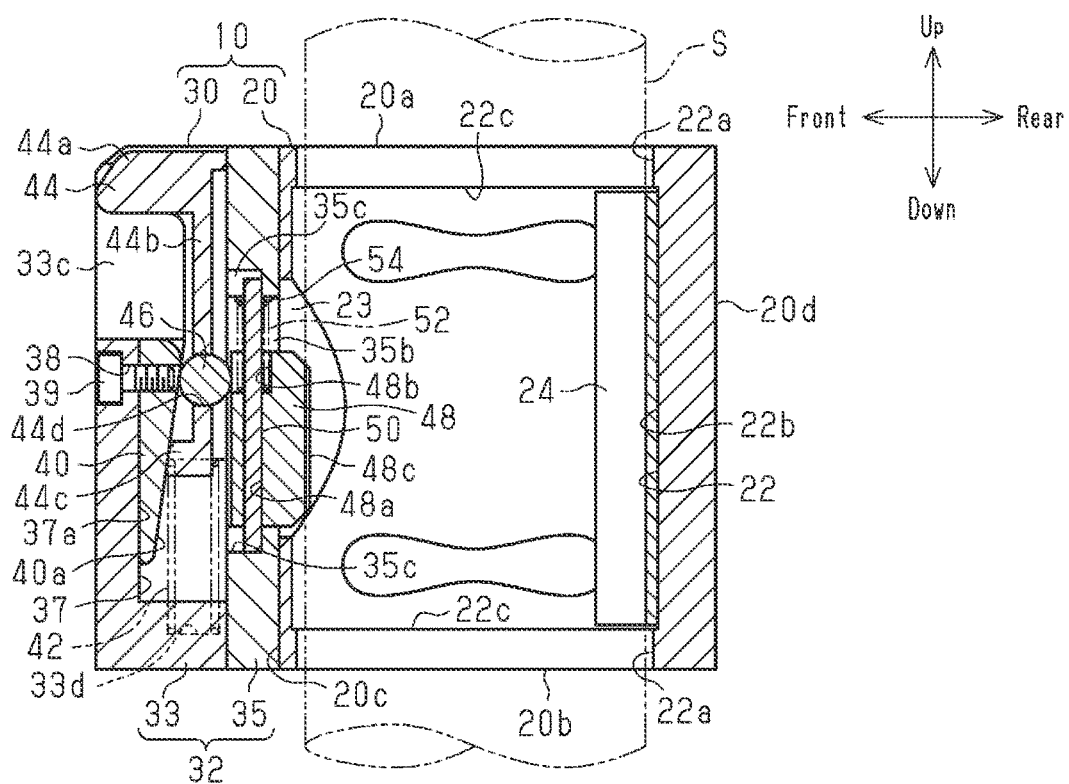
FIG. 2 is a vertical cross-sectional view of the clamping device in FIG. 1 when an operation member is located at a non-operation position.

The through-hole 22 includes small-diameter portions 22a, which are respectively located at the two opening ends of the through-hole 22, and a large-diameter portion 22b, which is slightly larger than the small-diameter portions 22a in diameter. As shown in FIGS. 1 and 2, a flexible non-slip sheet 24 adheres to a part of the inner circumferential surface of the large-diameter portion 22b corresponding to the fourth face 20d. The non-slip sheet 24 is made of plastic and is prevented from shifting in the extension direction of the through-hole 22 by gaps 22c, which are arranged between the small-diameter portions 22a and the large-diameter portion 22b.

The non-slip sheet 24 prevents slipping between the bracket 20 and a shaft S (described later), which is inserted through the through-hole 22, when the shaft S is pressed and clamped by a pressing body 48 of the clamping unit 30. The fourth face 20d of the bracket 20 includes a coupling portion (not shown) couplable to another mechanical component. The shaft S is an example of a clamping target.

Figure 4:
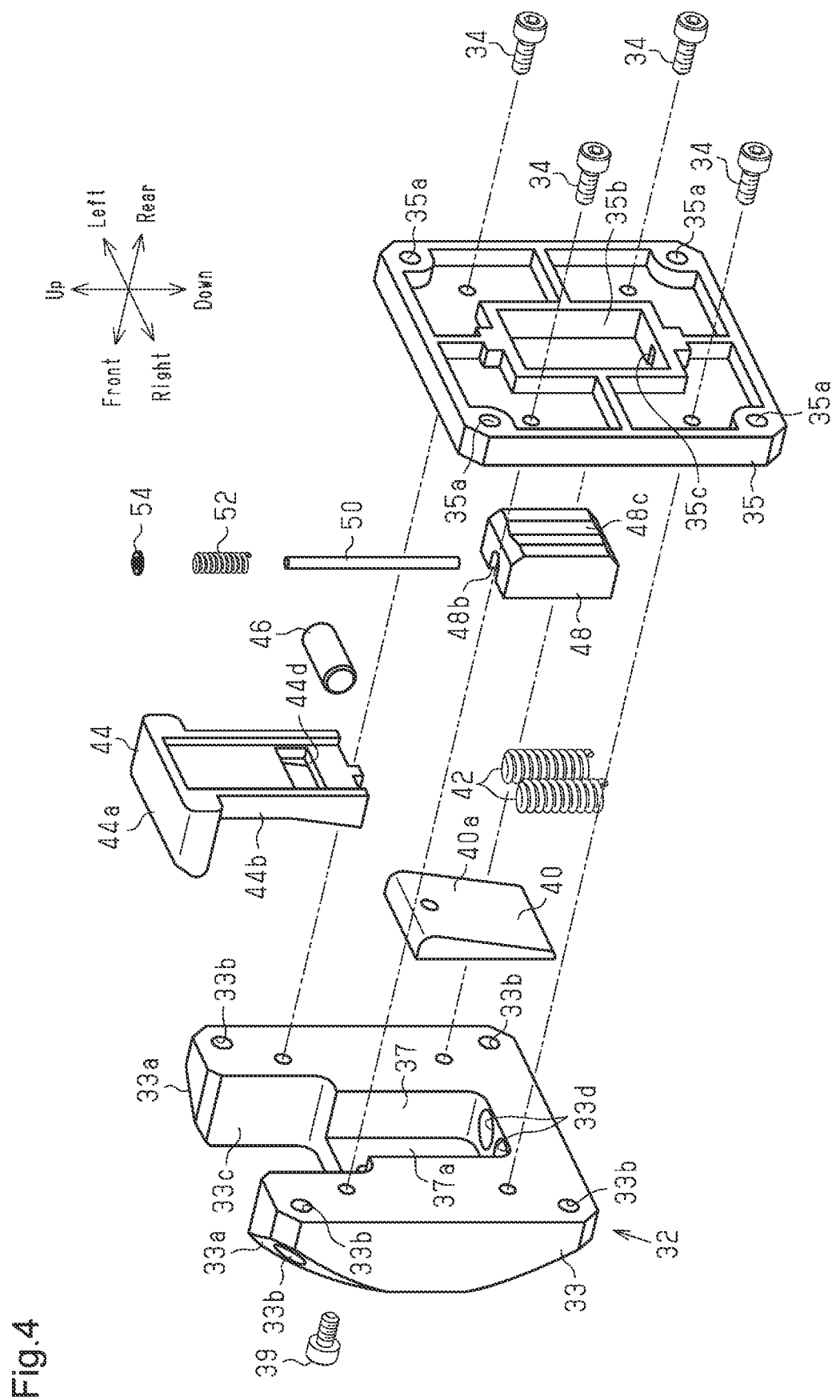
FIG. 4 is an exploded perspective view of the clamping unit in FIG. 1.

The clamping unit 30 is attached to the third face 20c of the bracket 20. As shown in FIG. 4, the clamping unit 30 includes, for example, a case 32, a wedge 40, two biasing springs 42, an operation member 44, a roller 46, the pressing body 48, a guide rod 50, and a return spring 52.

The case 32 includes a case body 33 and an attachment plate 35, which is fixed to the rear surface of the case body 33 by bolts 34. The rear surface of the case body 33 is opposed to the third face 20c (front face) of the bracket 20 in FIG. 3. In the present embodiment, each bolt 34 is a hexagon socket head bolt. Instead, the bolt 34 may be another type of bolt.

As shown in FIGS. 1 and 3, the case body 33 and the attachment plate 35 are quadrilateral. The case body 33 is thicker than the attachment plate 35 and includes four chamfered corners 33a on the front surface of the case body 33. Each corner 33a includes a stepped hole 33b, which extends through the case body 33 in the front-rear direction. The stepped hole 33b is an example of an attachment portion. The four corners of the attachment plate 35 each include an insertion hole 35a (refer to FIG. 4). The insertion holes 35a correspond to the stepped holes 33b, respectively. The four corners of the third face 20c of the bracket 20 each include an internal threaded hole 21.

The case 32 is fixed to the bracket 20 by fastening and securing attachment bolts 36, which respectively extend through the stepped holes 33b of the case body 33 and the insertion holes 35a of the attachment plate 35, to the internal threaded holes 21 of the bracket 20. In the present embodiment, each attachment bolt 36 is a hexagon socket head bolt. Instead, the attachment bolt 36 may be another type of bolt.

As shown in FIG. 4, the rear surface of the case body 33 centrally includes a groove 37, which opens upward and rearward. The lower end surface of the groove 37 includes two spring accommodation holes 33d.

As shown in FIG. 2, the case body 33 includes a stepped bolt insertion hole 38, which extends from the front surface of the case body 33 to an inner bottom surface 37a of the groove 37. The wedge 40 is fixed to the inner bottom surface 37a by fastening and securing a fixing bolt 39, which is inserted through the stepped bolt insertion hole 38 from the front surface of the case body 33, to the wedge 40 in the groove 37. As shown in FIG. 2, the upper end of the wedge 40 is arranged so as not to protrude upward from the opening of the upper end of the groove 37. The entire rear surface of the wedge 40 is inclined such that the upper part is located rearward from the lower part and is referred to as an inclined surface 40a, which is a flat surface. The inclined surface 40a is an example of an opposing surface opposed to the pressing body 48.

As shown in FIGS. 1 and 4, the case body 33 includes a guide groove 33c, which extends from the upper surface of the case body 33 to the upper end of the groove 37 and is wider than the groove 37 in the left-right direction.

As shown in FIGS. 2 to 4, the operation member 44 is arranged in the guide groove 33c and the groove 37 such that the operation member 44 is slidable in the up-down direction. In the present embodiment, the up direction is a pressing promotion direction with respect to the movement direction of the operation member 44, and the down direction is a pressing cancellation direction with respect to the movement direction of the operation member 44. The inclined surface 40a of the wedge 40 is inclined with respect to the pressing promotion direction and the pressing cancellation direction. The operation member 44 includes an operation portion 44a, which is located at the upper part of the operation member 44, an extension 44b, which extends downward from the operation portion 44a, a spring receiver 44c (refer to FIG. 2), which extends frontward from the lower part of the extension 44b.

The operation member 44 is downwardly movable until the lower surface of the spring receiver 44c contacts the lower end surface of the groove 37. The operation portion 44a has a slightly shorter width than the guide groove 33c in the left-right direction. When moving in the up-down direction, the operation member 44 is guided by the left and right inner surfaces of the guide groove 33c. The extension 44b has a slightly shorter width than the groove 37 in the left-right direction. When moving in the up-down direction, the extension 44b is guided by the left and right inner surfaces of the groove 37.

As shown in FIG. 4, the extension 44b includes a holding hole 44d, which extends in the left-right direction. The holding hole 44d is arranged in the extension 44b so as to be located in the groove 37 within any of the movement range of the operation member 44 in the up-down direction. As shown in FIG. 2, the roller 46, which includes an axis extending in the left-right direction, is rotationally arranged in the holding hole 44d. That is, the extension 44b of the operation member 44 is a holder that holds the roller 46. The roller 46 is an example of a movable body and a rolling element. As the operation member 44 moves in the up-down direction, the roller 46 moves in the same direction together with the operation member 44. At this time, the roller 46 rotates in a state in which the front part of the roller 46 is constantly in contact with the inclined surface 40a of the wedge 40 and the rear part of the roller 46 is constantly in contact with the front surface of the pressing body 48. The inclined surface 40a of the wedge 40 is an example of a contact surface on which the roller 46 (movable body and rolling element) contacts.

As shown in FIG. 2, the biasing springs 42 are arranged between the bottom surfaces of the spring accommodation holes 33d and the lower surface of the spring receiver 44c of the operation member 44. The two biasing springs 42 constantly bias the operation member 44 in the up direction, that is, the pressing promotion direction. The biasing spring 42 is an example of a first biasing member. In the present embodiment, the biasing spring 42 is a coil spring. Instead, the biasing spring 42 may be, for example, a leaf spring.

Figure 5:
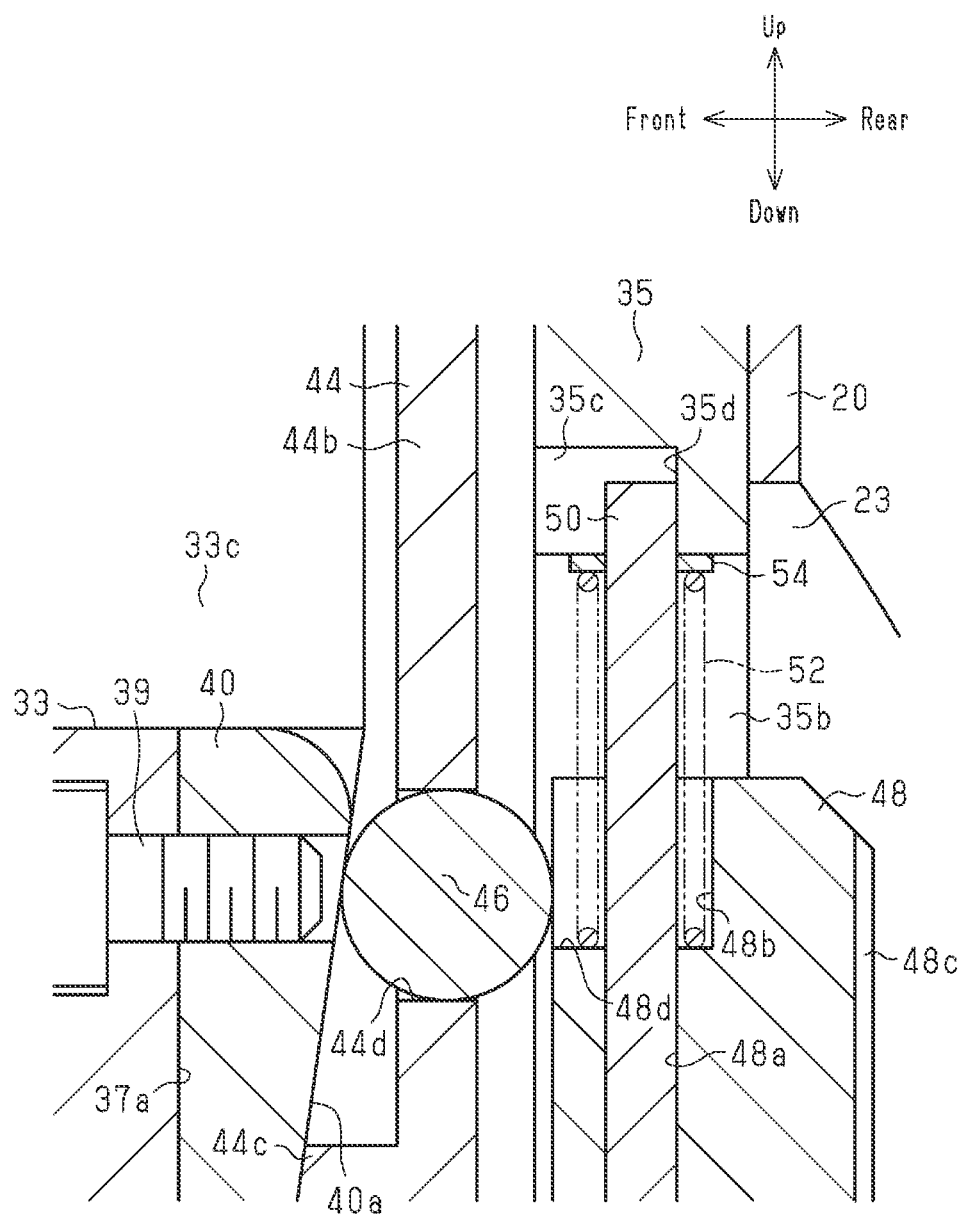
FIG. 5 is an enlarged cross-sectional view showing the main part of the clamping unit in FIG. 1.
Figure 6:
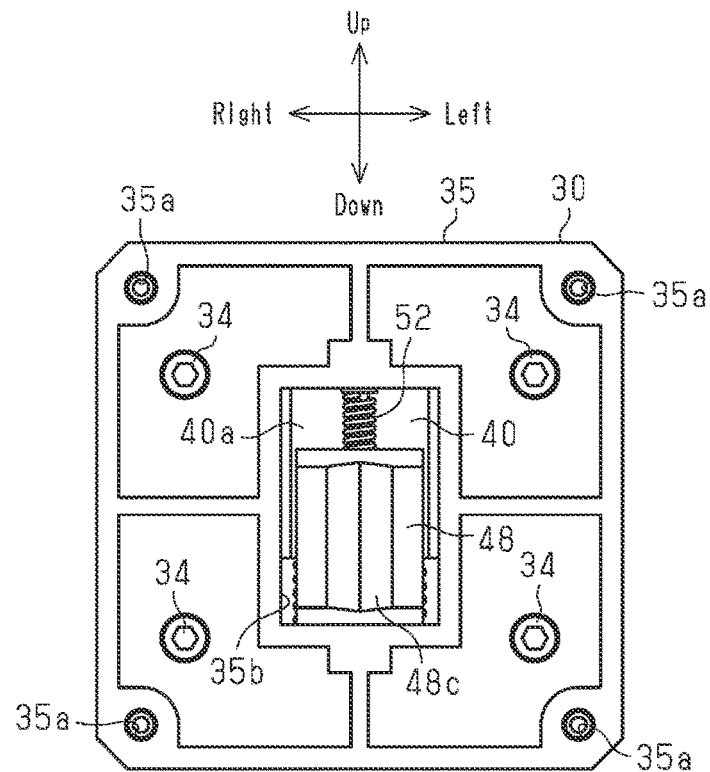
FIG. 6 is a rear view of the clamping unit in FIG. 1.

As shown in FIGS. 4 and 6, a rectangular sliding hole 35b extends in the up-down direction through the central portion of the attachment plate 35. As shown in FIGS. 2, 4, and 5, the upper and lower end surfaces of the sliding hole 35b are each provided with a sliding groove 35c, which opens toward the case body 33. The sliding hole 35b is an example of a guide that guides the pressing body 48.

The pressing body 48, which has the shape of a substantially rectangular parallelepiped, is fitted into the sliding hole 35b such that the pressing body 48 is slidable in the up-down direction and the front-rear direction. The pressing body 48 is arranged so as to oppose the inclined surface 40a. The rear surface of the pressing body 48 centrally includes a contact groove 48c in the left-right direction. The contact groove 48c extends in the up-down direction and has a V-shaped cross-section. The two inner surfaces that define the contact groove 48c are capable of contacting the circumferential surface of the shaft S, which will be described later. The contact groove 48c is an example of a recess.

The pressing body 48 is movable in the front-rear direction (i.e., a direction intersecting the up-down direction, which is the movement direction of the roller 46).

As shown in FIG. 2, the pressing body 48 includes a guide hole 48a, which extends through the pressing body 48 in the up-down direction, and the guide rod 50 is inserted through the guide hole 48a in a slidable manner That is, the pressing body 48 is slidable relative to the guide rod 50 in the up-down direction.

As shown in FIG. 5, the upper and lower ends of the guide rod 50 are respectively fitted into the sliding grooves 35c in a slidable manner in the front-rear direction. The guide rod 50 is movable rearward until the guide rod 50 engages an inner end surface 35d of the sliding groove 35c. FIG. 5 illustrates a state in which the upper end of the guide rod 50 is engaged with the inner end surface 35d of the sliding groove 35c.

As shown in FIG. 5, the portion of the upper end surface of the pressing body 48 corresponding to the guide hole 48a is provided with a spring fitting groove 48b. The inner end surface of the spring fitting groove 48b, where the guide hole 48a opens, is provided with an engagement step 48d.

As shown in FIG. 5, the opposite ends of the return spring 52, which is arranged around the guide rod 50, are engaged with the upper end surface of the sliding hole 35b and the engagement step 48d. The return spring 52, which is a coil spring, constantly presses the pressing body 48 downward. The return spring 52 is an example of a second biasing member. In the present embodiment, the return spring 52 is a coil spring. Instead, the return spring 52 may be, for example, a leaf spring. A spring seat 54 is arranged between the upper end of the return spring 52 and the upper end surface of the sliding hole 35b.

As shown in FIGS. 2 and 5, the pressing body 48 is arranged so as to be in constant contact with the rear part of the roller 46. When the operation member 44 moves upward (moves in the pressing promotion direction), the roller 46, pressed by the inclined surface 40a, presses the pressing body 48 rearward. At this time, the pressing body 48 is movable rearward until the guide rod 50 engages the inner end surface 35d of the sliding groove 35c. Referring to FIG. 2, the rearward movement of the pressing body 48 increases the protruding amount of the pressing body 48 from one side part of the case 32, that is, the amount of the pressing body 48 entering the through-hole 22 (large-diameter portion 22b) of the bracket 20.

Downward movement of the operation member 44 cancels the pressing of the inclined surface 40a against the pressing body 48 through the roller 46. Thus, the pressing body 48 and the guide rod 50 are permitted to move frontward. Accordingly, the protruding amount of the pressing body 48 from one side part of the case 32, that is, the amount of the pressing body 48 entering the through-hole 22 (large-diameter portion 22b) of the bracket 20, can be decreased.

As described above, the amount of the pressing body 48 entering the through-hole 22 (large-diameter portion 22b), that is, the protruding amount of the pressing body 48 from the case 32, can be changed depending on the position of the operation member 44 in the vertical direction. In a case where the entering amount is the maximum (the state shown in FIG. 2), even if a shaft which us insertable into each of the small-diameter portions 22a of the through-hole 22 is used, when the shaft has a larger diameter than the separation distance between the pressing body 48 and the portion corresponding to the inner circumferential surface of the through-hole 22 opposed to the pressing body 48, the shaft interferes with the pressing body 48 and is thus cannot be inserted through the entire through-hole 22.

The position of the operation member 44 with the maximum amount of the pressing body 48 entering the through-hole 22 (large-diameter portion 22b) as described above is referred to as a non-operation position.

In a state in which the shaft S is clamped by the pressing body 48 and the portion corresponding to the inner circumferential surface of the through-hole 22 opposed to the pressing body 48, downward movement of the operation member 44 (i.e., movement of the operation member 44 in the pressing cancellation direction) sets the amount of the pressing body 48 entering the through-hole 22 to be smaller than the entering amount when the shaft S is clamped. This enables the clamping to the shaft S to be cancelled.

Operation of First Embodiment

The operation of the clamping device 10 and the clamping unit 30 will now be described with reference to FIGS. 2, and 7 to 9. To facilitate understanding, the clamping device 10 is clamped to the shaft S, which is arranged so as to extend upward and downward, in the following description.

1. Initial State

FIG. 2 illustrates an initial state in which the operation member 44 is not actuated the shaft S is not inserted through the through-hole 22 of the bracket 20.

In this case, biasing the operation member 44 in the up direction by the biasing springs 42 moves the operation member 44 to the non-operation position. The operation of the inclined surface 40a causes the roller 46 to maximize the protruding amount of the pressing body 48 into the through-hole 22 (large-diameter portion 22b).

Accordingly, even if a shaft which is insertable into each of the small-diameter portions 22a of the through-hole 22 is used, when the shaft has a larger diameter than the portion corresponding to the inner circumferential surface of the through-hole 22 opposed to the pressing body 48, the shaft cannot be clamped by the clamping device 10. The pressing body 48 is biased by the return spring 52 so that the lower surface of the pressing body 48 contacts the lower end surface of the sliding hole 35b.

2. Actuation of Operation Member

Figure 7:
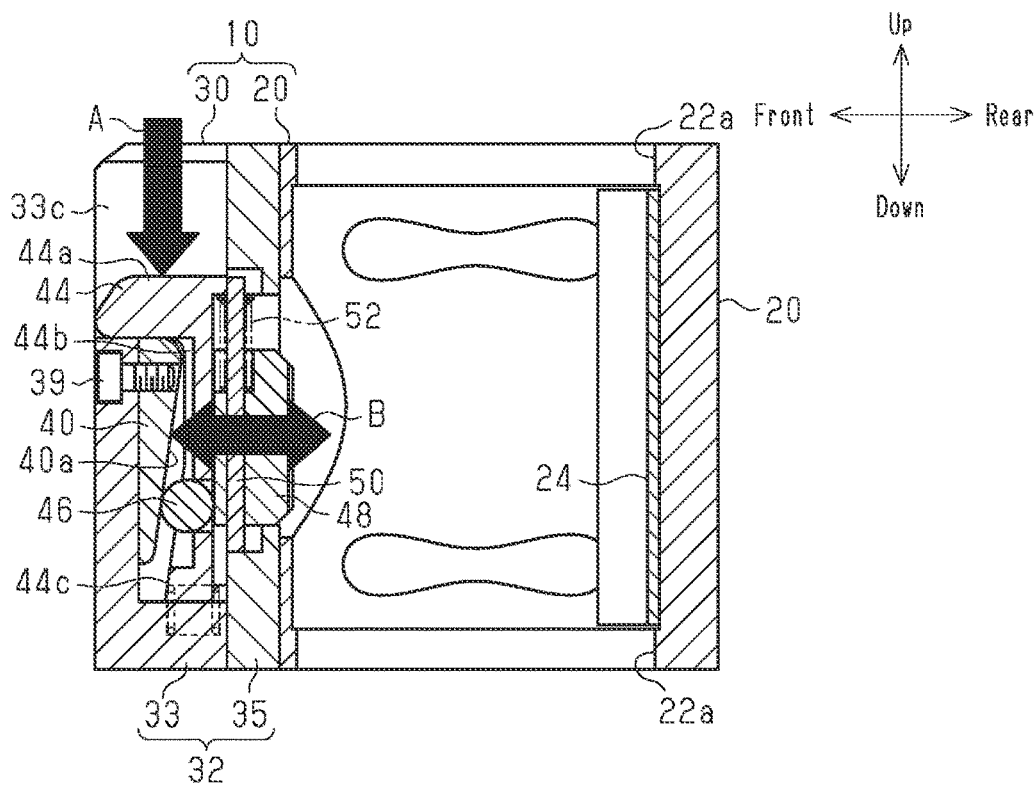
FIG. 7 is a vertical cross-sectional view of the clamping device in FIG. 1 when the operation member is actuated in a pressing cancellation direction.

As shown in FIG. 7, a worker performs a press-down actuation to downwardly press the operation member 44 (in the pressing cancellation direction) from the non-operation position against biasing forces of the biasing springs 42. In FIG. 7, arrow A indicates the direction in which an actuation load acts on the operation member 44.

The actuation of the operation member 44 downwardly moves the roller 46 together with the operation member 44 to cancel the restriction of the initial state by the inclined surface 40a and allows the roller 46 and the pressing body 48 to move in the front-rear direction. In FIG. 7, arrow B indicates a direction in which the roller 46 and the pressing body 48 are actuated.

While the downward movement of the operation member 44 causes the spring receiver 44c to contact the lower end surface of the groove 37 in FIG. 7, the operation member 44 does not necessarily have to be downwardly moved until the spring receiver 44c contacts the lower end surface of the groove 37. That is, the operation member 44 simply needs to be downwardly moved to a position where the protruding amount of the pressing body 48 can decrease and where the separation distance between the pressing body 48 and the portion corresponding to the inner circumferential surface of the through-hole 22 opposed to the pressing body 48 can be set to be larger than the diameter of the shaft S.

In a state in which the press-down actuation is performed to downwardly press the operation member 44, inserting the shaft S into the bracket 20 causes the pressing body 48 (i.e., the contact groove 48c) to be pressed by the outer circumferential surface of the shaft S and moved frontward together with the roller 46.

Figure 8:
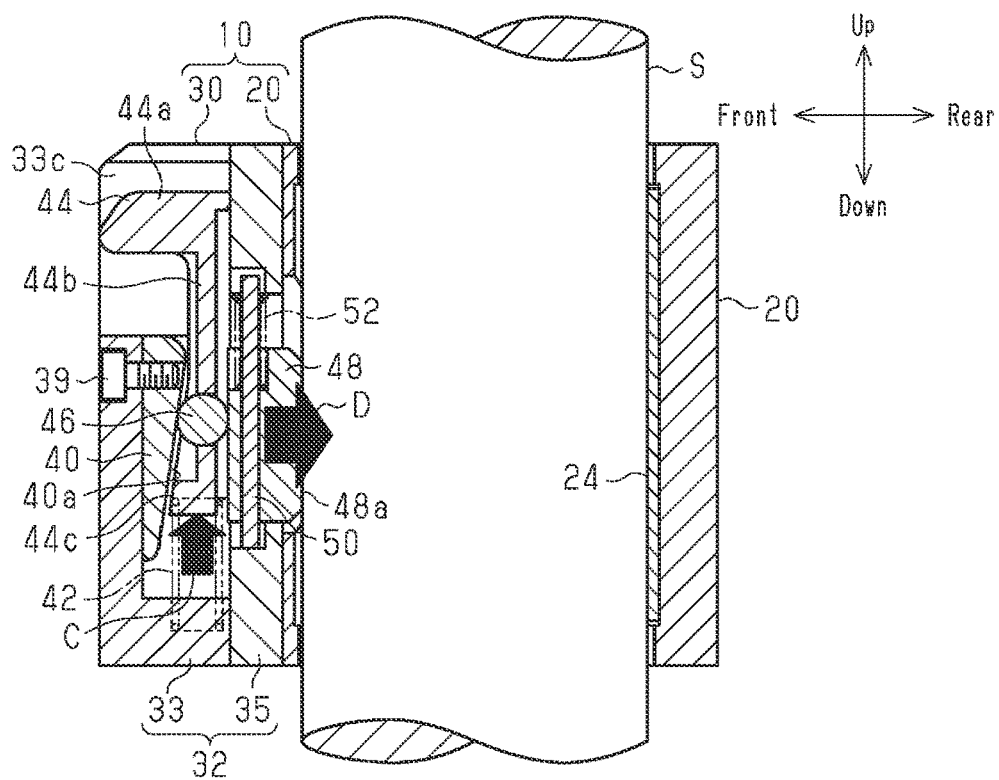
FIG. 8 is a vertical cross-sectional view of the clamping device in FIG. 1 when the operation member moves in a pressing promotion direction from the position shown in FIG. 7.

3. State in which Actuation Load of Depressing Operation Member 44 is Merely Eliminated Next, as shown in FIG. 8, when the actuation load that has depressed the operation member 44 is eliminated, the biasing forces of the biasing springs 42 move the operation member 44 and the roller 46 upward (in the pressing promotion direction). As a result, the operation of the inclined surface 40a of the wedge 40 causes the roller 46 to press the pressing body 48 against the shaft S.

In this state, the load acting on the shaft S includes only a load based on the biasing forces of the biasing springs 42. In FIG. 8, arrow C indicates the direction in which the biasing forces of the biasing springs 42 act. In FIG. 8, arrow D indicates the direction in which the pressing body 48 acts (the direction toward the shaft S).

4. Operation Resulting from Weight of Clamping Device 10

When the actuation load on the operation member 44 is eliminated, the clamping device 10 attempts to fall due to the weight of the clamping device 10. At this time, the pressing body 48 attempts to keep the positional relationship with the shaft S using a frictional force between the pressing body 48 and the shaft S. Thus, the portion of the clamping device 10 excluding the pressing body 48 slightly moves downward against the biasing force of the return spring 52.

Figure 9:
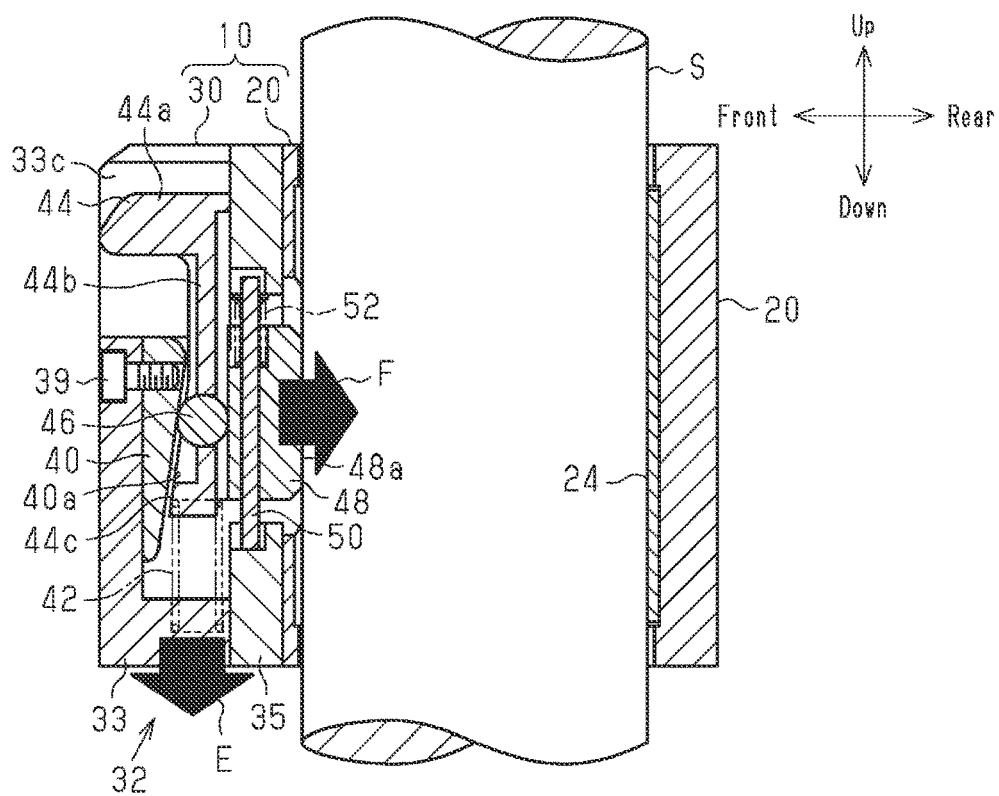
FIG. 9 is a vertical cross-sectional view of the clamping device in FIG. 1, illustrating the operation when the clamping device receives the force acting in a direction in which the clamping device is falling due to its weight.

Further, a part of the force acting in the direction in which the clamping device 10 falls due to its weight (the direction in which arrow E is oriented in FIG. 9) is converted by the interaction between the inclined surface 40a and the roller 46 into the force of pressing the pressing body 48 toward the shaft S. Thus, the clamping device 10 no longer falls. In FIG. 9, arrow F indicates the direction of the force of pressing the pressing body 48 toward the shaft S.

5. Removal of Clamping Device 10

To remove the clamping device 10 from the shaft S, in the same manner as "2. Actuation of Operation Member," the worker simply needs to cancel the clamping by performing the press-down actuation to press the operation member 44 downward (in the pressing cancellation direction) against the biasing forces of the biasing springs 42 as shown in FIG. 7.

The actuation of the operation member 44 downwardly moves the roller 46 together with the operation member 44 and cancels the restriction of the initial state by the inclined surface 40a. The biasing force of the return spring 52 causes the pressing body 48 to contact the lower end surface of the sliding hole 35b as shown in FIG. 2.

Consequently, the roller 46 and the pressing body 48 are movable in the front-rear direction. Thus, the bracket 20 simply needs to be removed from the shaft S.

When a rolling element holds a clamping target, the surface pressure acting from the rolling element to the clamping target tends to be high. This may deform the clamping target. However, such deformation does not occur in the present embodiment. That is, the pressing body 48 is arranged between the roller 46 (rolling element) and the shaft S (clamping target) to decrease the surface pressure acting on the shaft S and thus limit the deformation of the shaft S. Particularly, in the present embodiment, the pressing body 48 includes the contact groove 48c. Each of the two inner surfaces that define the contact groove 48c contacts the circumferential surface of the shaft S. This decreases the surface pressure acting on the shaft S and thus effectively limits the deformation of the shaft S.

In a typical clamping device, components in different sizes need to be prepared according to the diameter of a shaft serving as a clamping target as the components of the clamping device. This increases the cost.

In the clamping device 10 of the present embodiment, the clamping unit 30 with the stepped holes 33b (attachment portions) is attachable to the bracket 20. Accordingly, a common clamping unit 30 is attachable to brackets 20 in various sizes through which clamping targets with different diameters are insertable. Even if clamping targets have different diameters, the clamping unit 30 can be commonized. This reduces the number of components and thus lowers the cost.

The present embodiment has the following features.

(1) In the present embodiment, the clamping unit 30 includes the case 32, the operation member 44, which is arranged in the case 32 such that the operation member 44 is movable back and forth in the pressing cancellation direction and the pressing promotion direction, and the pressing body 48, which is arranged so as to oppose the inclined surface 40a (opposing surface and contact surface) in the case 32. The pressing body 48 is arranged in the case 32 in a movable manner such that the protruding amount of the pressing body 48 from one side part of the case 32 is changeable. The movement direction of the pressing body 48 intersects (more specifically, is orthogonal to) the movement direction of the operation member 44 (i.e., the pressing cancellation direction and the pressing promotion direction). The inclined surface 40a is inclined with respect to the pressing cancellation direction and the pressing promotion direction. The clamping unit 30 also includes the roller 46 (movable body), which is arranged between the pressing body 48 and the inclined surface 40a in contact with the pressing body 48 and the inclined surface 40a. The roller 46 moves together with the operation member 44 along the pressing body 48 and the inclined surface 40a as the operation member 44 moves in each of the pressing cancellation direction and the pressing promotion direction. The roller 46 is also movable in the same direction as the movement direction of the pressing body 48. The inclined surface 40a increases the protruding amount of the pressing body 48 from the case 32 when the roller 46 changes in position as the operation member 44 moves in the pressing promotion direction. The inclined surface 40a eases the pressing of the roller 46 against the pressing body 48 when the roller 46 changes in position as the operation member 44 moves in the pressing cancellation direction, so that a decrease in the protruding amount of the pressing body 48 from the case 32 is permitted. The clamping unit 30 further includes the biasing springs 42 (first biasing members), which bias the operation member 44 in the pressing promotion direction. The case 32 is configured to be attached to the bracket 20, into which the clamping target is insertable. The case 32 includes the stepped holes 33b (attachment portions) and is attachable to the bracket 20 at the stepped holes 33b.

As a result, in the present embodiment, even if the diameters of clamping targets are different, commonizing the clamping unit reduces the number of components and thus lowers the cost.

(2) The case 32 includes the sliding hole 35b (guide), which guides the movement of the pressing body 48 in the direction in which the protruding amount of the pressing body 48 changes. In the present embodiment, the pressing body 48 is movable in a favorable manner in the direction in which the protruding amount changes.

(3) The sliding hole 35b (guide) is further configured to guide the movement of the pressing body 48 in the pressing promotion direction of the operation member 44. In addition, the clamping unit 30 includes the return spring 52 (second biasing member), which biases the pressing body 48 in the direction opposite to the direction in which the roller 46 (movable body) changes in position, that is, biases the pressing body 48 in the same direction as the pressing cancellation direction.

In the present embodiment, during the clamping of the shaft S, when the actuation load on the operation member 44 is eliminated, the clamping device 10 attempts to fall due to the weight of the clamping device 10 and the pressing body 48 attempts to keep the positional relationship with the shaft S using a frictional force between the pressing body 48 and the shaft S. Thus, the portion of the clamping device 10 excluding the pressing body 48 slightly moves downward against the biasing force of the return spring 52. Further, a part of the force acting in the direction in which the clamping device 10 falls due to its weight is converted by the interaction between the inclined surface 40a and the roller 46 into the force of pressing the pressing body 48 toward the shaft S. This prevents the clamping device 10 from falling and allows the shaft S to be securely clamped.

(4) In the clamping unit 30 of the present embodiment, the surface of the pressing body 48 opposed to the shaft S (clamping target) is provided with the contact groove 48c (recess), which extends in the direction in which the shaft S extends. This decreases the surface pressure acting on the shaft S and limits the deformation of the shaft S.

(5) In the clamping unit 30 of the present embodiment, the roller 46 serves as the movable body (rolling element) arranged between the pressing body 48 and the inclined surface 40a. The roller 46 rolls between the pressing body 48 and the inclined surface 40a in a favorable manner and thus facilitates the actuation of the operation member 44.

(6) In the present embodiment, the clamping device 10 includes the clamping unit 30 and the bracket 20. The bracket 20 includes the through-hole 22, into which the shaft S (clamping target) is inserted, and the connection hole 23 (communication portion), which extends in the direction intersecting the extending direction of the through-hole 22 and connects to the through-hole 22. The pressing body 48 is capable of entering the connection hole 23. The clamping unit 30 is attached to the bracket 20 at the stepped holes 33b (attachment portions).

As a result, in the present embodiment, the clamping device including the advantage described in the above-described item (1) is gained.

Second Embodiment

The clamping unit 30 according to a second embodiment will now be described with reference to FIGS. 10 to 12. In the present embodiment, like or the same reference numerals are given to those components that are like or the same as the corresponding components of the clamping unit 30 of the first embodiment. Such components will not be described. Instead, the different components will be mainly described.

The second embodiment differs from the first embodiment in the structure of the wedge 40. Also, the second embodiment differs from the first embodiment in that two balls are provided as rolling elements (movable bodies).

Figure 10:
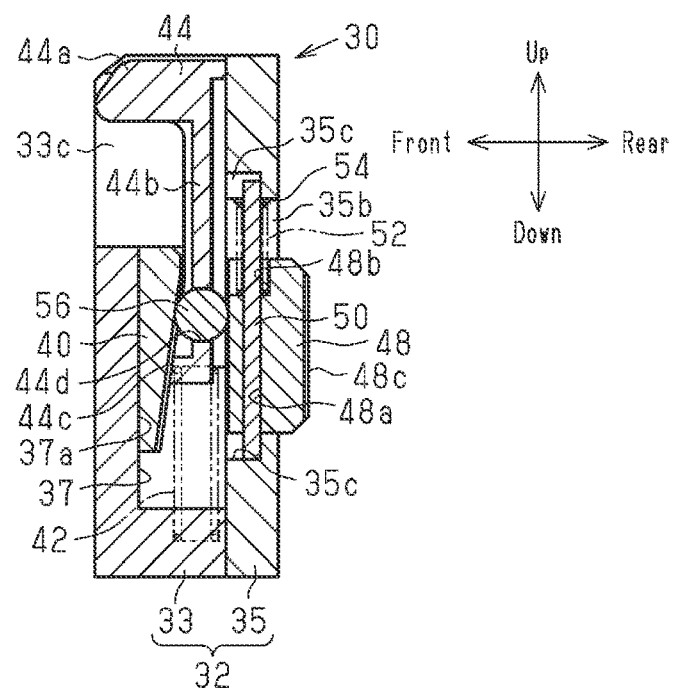
FIG. 10 is a vertical cross-sectional view of a clamping unit according to a second embodiment.
Figure 11:
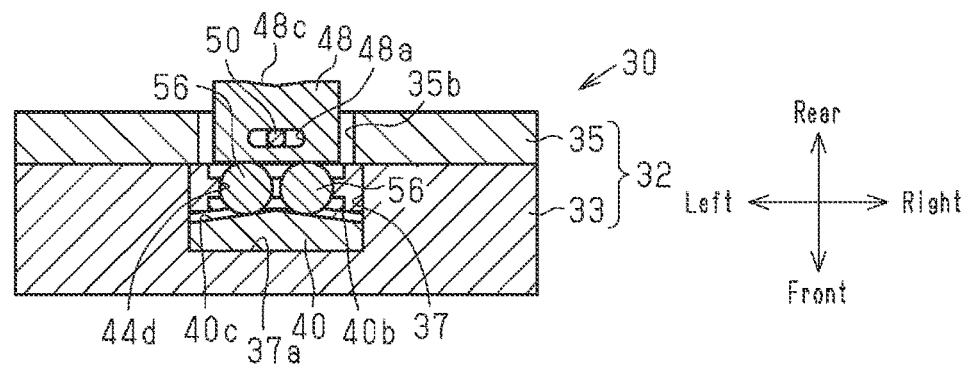
FIG. 11 is a horizontal cross-sectional view of the clamping unit in FIG. 10.
Figure 12:
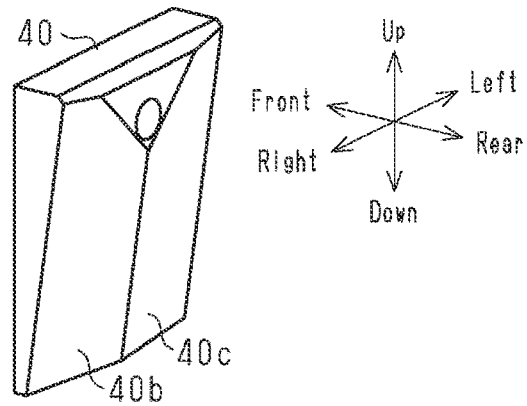
FIG. 12 is a perspective view showing the wedge of the clamping unit in FIG. 10.

As shown in FIGS. 10, 11, and 12, the rear surface of the wedge 40 is provided with two inclined surface parts 40b and 40c. As shown in FIG. 11, the inclined surface parts 40b and 40c are flat and intersect each other at a predetermined angle such that the entire inclined surface parts 40*b* and 40*c* have a chevron-shaped cross-section. Further, the inclined surface parts 40*b* and 40*c* are inclined such that the upper parts are located rearward from the lower parts. Each of the two inclined surface parts 40*b* and 40*c* is an example of an inclined surface (opposing surface and contact surface) inclined with respect to the pressing cancellation direction and the pressing promotion direction. As shown in FIGS. 10 and 11, two balls 56 are arranged between the inclined surface parts 40*b* and 40*c* and the front surface of the pressing body 48. Each of the balls 56 is an example of a spherical body, a movable body and a rolling element.

As shown in FIG. 11, the cross-sectional shape of the guide hole 48*a* is an elongated-hole shape extending in the left-right direction such that the pressing body 48 is movable in the left-right direction with respect to the guide rod 50. The pressing body 48 is set to be movable in the left-right direction with respect to the guide rod 50 so that the pressing body 48 is movable to a proper position in correspondence with the outer shape of a clamping target when the pressing body 48 contacts the clamping target.

In the clamping device 10, which is structured by coupling the clamping unit 30 to the bracket 20 of the first embodiment, the shaft S inserted through the through-hole 22 of the bracket 20 can be securely clamped by actuating the operation member 44 in the same manner as the first embodiment. Particularly, in the present embodiment, as shown in FIG. 11, the operation of the inclined surface parts 40*b* and 40*c* causes the two balls 56 to press the pressing body 48 toward the rear and also in the left-right direction. Thus, a clamping force can be exerted also in the left-right direction.

The above-described embodiments may be modified as follows. The above-described embodiments and the following modifications can be combined as long as the combined modifications remain technically consistent with each other.

Modifications of the inclined surface inclined with respect to the pressing cancellation direction and the pressing promotion direction will now be described with reference to FIGS. 13A to 13C and FIGS. 14A and 14B. The following description focuses on the differences from the first embodiment. Like or the same reference numerals are given to the corresponding components of the first embodiment, and such components will not be described. Although the biasing springs 42 that bias the operation member 44 in the pressing promotion direction are not illustrated in the drawings, it should be understood that the biasing springs 42 are actually provided.

Figure 13A:
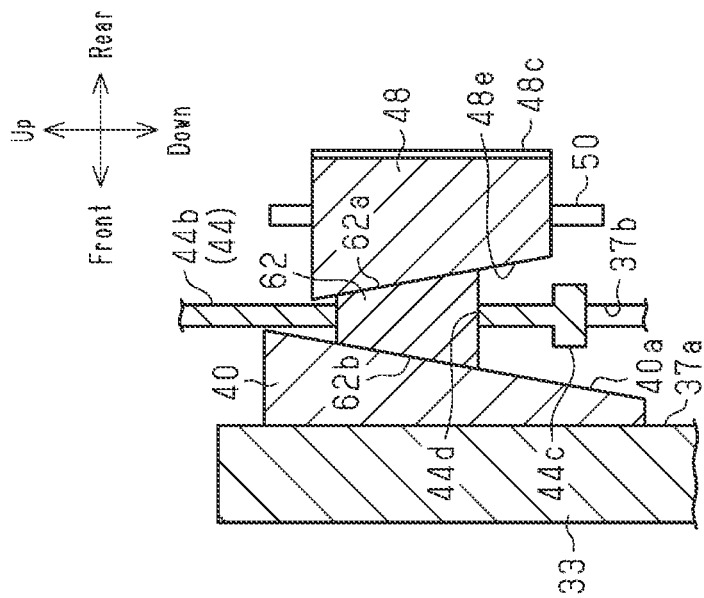
FIGS. 13A to 13C are schematic cross-sectional views each showing a clamping unit according to a modification.

In an embodiment shown in FIG. 13A, the wedge 40 is omitted. The inner bottom surface 37*a* (the surface opposed to the pressing body 48) of the groove 37 of the case body 33 is flat. In a state in which the spring receiver 44*c* of the operation member 44 is in contact with the inner bottom surface 37*a*, the operation member 44 is movable in the up-down direction. Further, a rolling element 60, which is a movable body held at a holding hole 44*d* of the operation member 44, is in contact with the inner bottom surface 37*a* in a rollable manner.

The rolling element 60 is a ball or a cylindrical roller. The pressing body 48 includes a front surface 48*e*, which is opposed to the inner bottom surface 37*a*. The front surface 48*e* is an inclined surface inclined such that the case body 33 becomes closer toward the upper part of the front surface 48*e*. The front surface 48*e* is in contact with the rolling element 60.

Figure 13B:
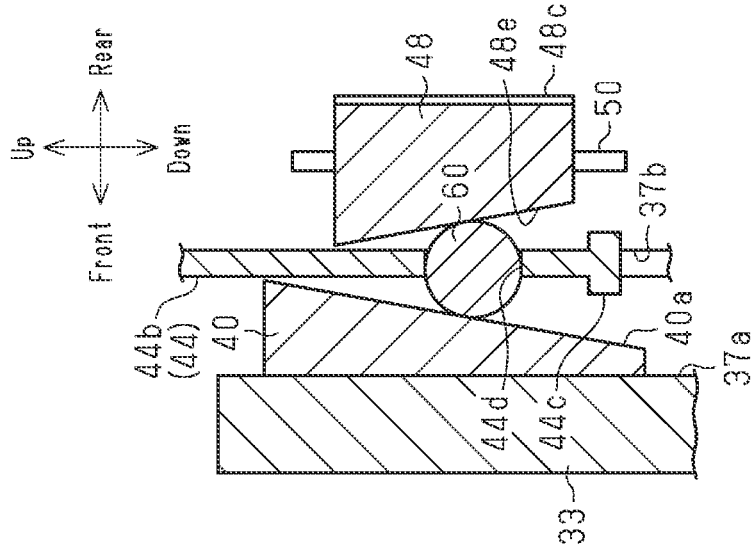

In an embodiment shown in FIG. 13B, the structure of the embodiment shown in FIG. 13A is combined with the structure of the first embodiment. That is, the structure of the embodiment shown in FIG. 13B includes the wedge 40 with the inclined surface 40*a* and includes the pressing body 48 with an inclined surface 48*e*.

Figure 13C:
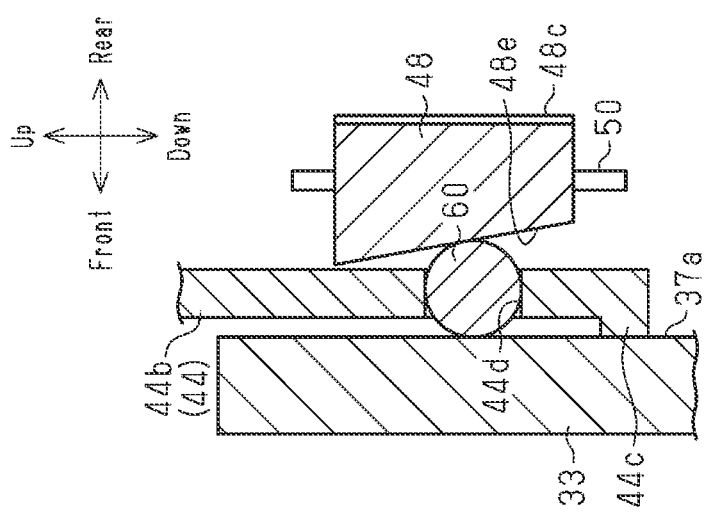

An embodiment shown in FIG. 13C is a modification of the embodiment shown in FIG. 13B. In the embodiment shown in FIG. 13C, the rolling element 60 is changed to a movable body 62, which has a trapezoidal cross-section. The movable body 62 includes a rear surface 62*a*, which is an inclined surface that slides in contact with the front surface 48*e* (inclined surface) of the pressing body 48. The movable body 62 also includes a front surface 62*b*, which is an inclined surface that slides in contact with the inclined surface 40*a* of the wedge 40.

In the embodiments shown in FIGS. 13B and 13C, the spring receiver 44*c* is arranged such that the spring receiver 44*c* does not interfere with the inclined surface 40*a* or the front surface 48*e* when the operation member 44 moves in the up-down direction. At least one of the left and right inner surfaces of the groove 37 is provided with a guide groove 37*b*, which extends in the up-down direction. The operation member 44 includes a guide projection (not shown) engaged with the guide groove 37*b*. The movement of the operation member 44 in the up-down direction is guided by the guide groove 37*b*. The inclined surface 40*a* of the wedge 40 and the front surface 62*b* of the movable body 62 are an example of opposing surfaces opposed to each other. The rear surface 62*a* of the movable body 62 and the front surface 48*e* of the pressing body 48 are an example of opposing surfaces opposed to each other.

The movable body 62 may be separate from the operation member 44 or may be provided integrally with the operation member 44.

Figure 14A:
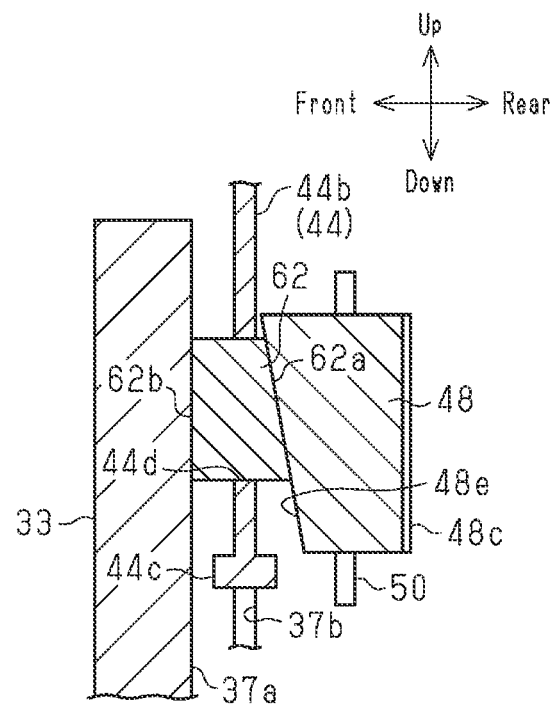
FIGS. 14A and 14B are schematic cross-sectional views each showing a clamping unit according to a modification.

In an embodiment shown in FIG. 14A, the wedge 40 is omitted from the structure shown in FIG. 13C. The inner bottom surface 37*a* (the surface opposed to the pressing body 48) of the groove 37 of the case body 33 is flat. The movable body 62 is movable in the up-down direction with the front surface 62*b* in contact with the inner bottom surface 37*a*. The front surface 62*b* of the movable body 62 is not an inclined surface but a flat surface parallel to the pressing cancellation direction and the pressing promotion direction. The rear surface 62*a* of the movable body 62 and the front surface 48*e* of the pressing body 48 are opposing surfaces opposed to each other and inclined surfaces.

Figure 14B:
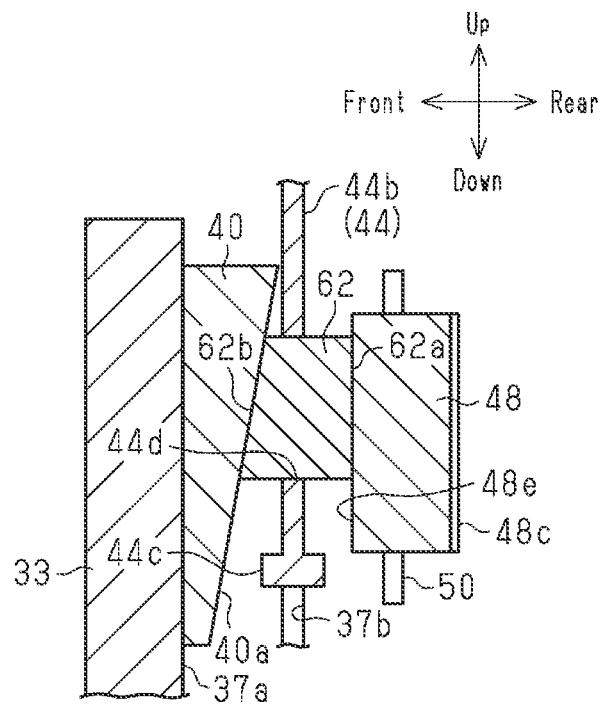

In an embodiment shown in FIG. 14B, the rear surface 62*a* of the movable body 62 and the front surface 48*e* of the pressing body 48 are changed from the inclined surfaces of the structure shown in FIG. 13C to flat surfaces parallel to the pressing cancellation direction and the pressing promotion direction. The inclined surface 40*a* of the wedge 40 and the front surface 62*b* of the movable body 62 are opposing surfaces opposed to each other and inclined surfaces.

The embodiments shown in FIG. 13A to 14B have the same advantages as those of the first embodiment.

Figure 15:
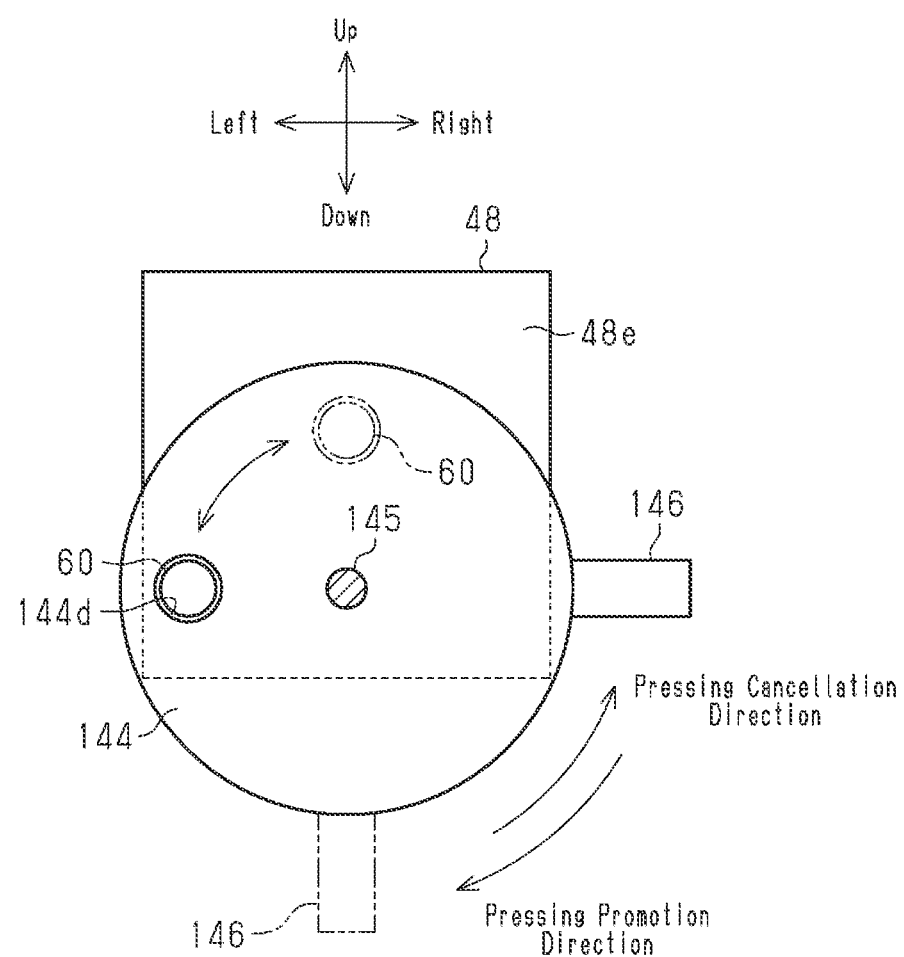
FIG. 15 is a schematic cross-sectional view showing a clamping unit according to a modification.

In each of the above-described embodiments, the pressing cancellation direction and the pressing promotion direction of the operation member 44 are not limited to the up-down direction and may be, for example, set as shown in FIG. 15.

In an embodiment shown in FIG. 15, the operation member 44, which moves in the up-down direction, in the structure of the first embodiment is replaced with a circular operation member 144, which is rotationally supported. The operation member 144 is rotationally supported by the case body 33 by a rotary shaft 145, which extends in the front-rear direction. An operation lever 146 radially protrudes from the outer circumference part of the operation member 144 so that the worker can operate the operation lever 146 from the outside of the case body 33. In FIG. 15, the clockwise direction is set as the pressing promotion direction, and the counterclockwise direction is set as the pressing cancellation direction. The operation member 144 includes a holding hole 144d, which is located away from the operation lever 146 by 180° with respect to the rotary shaft 145. The holding hole 144d holds the rolling element 60. The rolling element 60 may be a ball or a roller. The rolling element 60 is in constant contact with the inclined surface 40a (refer to FIG. 2) of the wedge 40 that basically has the same structure as the inclined surface 40a of the first embodiment, which is arranged along the movement path of the rolling element 60.

The operation member 144 is constantly biased in the pressing promotion direction by, for example, a coil spring (not shown) (first biasing member) wound around the rotary shaft 145. In a state in which a clamping target is not clamped, the operation member 144 is engaged with a stopper (not shown) and arranged at the non-operation position.

When the operation lever 146 is used to pivot the operation member 144 in the pressing cancellation direction from the non-operation position, the rolling element 60 moves on the inclined surface 40a of the wedge 40 to ease the pressing of the pressing body 48. When the actuation of the operation member 144 is cancelled from this state, the operation member 144 and the rolling element 60 are pivoted in the pressing promotion direction by a biasing force of the first biasing member so that the rolling element 60 presses the pressing body 48. Even such a structure achieves the same advantages as those of the first embodiment.

In the structure of FIG. 15, the structures of the movable body and the inclined surface shown in FIGS. 13A to 14B may be employed. Additionally, the clockwise direction may be set as the pressing cancellation direction, and the counterclockwise direction may be set as the pressing promotion direction. Further, the arrangement of the operation lever 146 is not limited to the arrangement shown in FIG. 15 and may be changed.

The clamping target is not limited to the shaft S. Any clamping target may be used as long as it can be inserted through the through-hole 22 of the bracket 20.

The wedge 40 may be separate from the case body 33 or may be provided integrally with the case body 33.

The cross-section of the through-hole 22 does not have to be circular and may be polygonal, for example, triangular, quadrilateral, pentagonal, or hexagonal. Alternatively, the cross-sectional of the through-hole 22 may have another shape such as oval shape.

As long as the clamping unit 30 can be attached to the bracket, the attachment portion does not need to have the structure of the stepped hole 33b. For example, the bracket may include a bolt insertion hole such that a bolt inserted through the bolt insertion hole is fastened to a female threaded hole serving as the attachment portion of the clamping unit 30.

The clamping unit 30 may be attached to the bracket 20 in an attachable and detachable manner.

When the movable body is a spherical body, its number may be singular or plural.

The insertion portion into which the clamping target is insertable is not limited to the through-hole 22 and may be, for example, a groove that is provided on the bracket 20 and has a C-shaped cross-section. The clamping target is insertable into the groove having a C-shaped cross-section. The connection portion that the pressing body can enter connects to the insertion portion in a direction that is orthogonal to (intersects) the extending direction of the insertion portion with a C-shaped cross-section.

The invention claimed is:

1. A clamping unit comprising:
   a case with a contact surface, the contact surface being fixedly provided on the case so as not to move with respect to the case;
   an operation member arranged in the case such that the operation member is movable back and forth in a pressing cancellation direction and a pressing promotion direction relative to the case;
   a pressing body arranged so as to oppose the contact surface, the pressing body being arranged in the case in a movable manner such that a protruding amount of the pressing body from a side part of the case is changeable;
   a movable body arranged between the pressing body and the contact surface in contact with the pressing body and the contact surface, the movable body being configured to move along the pressing body and the contact surface as the operation member moves in each of the pressing cancellation direction and the pressing promotion direction; and
   a first biasing member that biases the operation member in the pressing promotion direction, wherein
   the operation member holds the movable body to move in each of the pressing cancellation direction and the pressing promotion direction together with the movable body,
   and the contact surface includes an inclined surface inclined with respect to the pressing cancellation direction and the pressing promotion direction,
   the inclined surface is configured to:
      press the movable body toward the pressing body as the operation member moves in the pressing promotion direction together with the movable body, so that the protruding amount of the pressing body from the case increases; and
      permit the movable body to move away from the pressing body as the operation member moves in the pressing cancellation direction together with the movable body, so that a decrease in the protruding amount of the pressing body from the case is permitted, and
   the case includes an attachment portion and is configured to be attached to a bracket at the attachment portion, a clamping target being insertable into the bracket.

2. The clamping unit according to claim 1, wherein the case includes a guide that guides movement of the pressing body in a direction in which the protruding amount of the pressing body changes.

3. The clamping unit according to claim 2, wherein the guide is configured to guide movement of the pressing body in the pressing promotion direction, and the clamping unit further comprises a second biasing member that biases the pressing body in the pressing cancellation direction.

4. The clamping unit according to claim 1, wherein a portion of the pressing body opposed to the clamping target is provided with a recess extending in a direction in which the clamping target extends.

5. The clamping unit according to claim 1, wherein the movable body is a rolling element, and the inclined surface is arranged on at least one of the pressing body or the contact surface.

6. The clamping unit according to claim 1, wherein the movable body includes two spherical bodies, the inclined surface includes two inclined surface parts provided on the contact surface such that the two inclined surface parts intersect each other at a predetermined angle, and the two spherical bodies are in contact with the two inclined surface parts, respectively.

7. The clamping unit according to claim 1, wherein
the movable body includes two opposing surfaces in contact with the pressing body and the contact surface, respectively, and
one opposing surface of the two opposing surfaces that is in contact with the contact surface is an inclined surface.

8. A clamping device comprising:
the clamping unit according to claim 1; and
a bracket including an insertion portion and a connection portion, a clamping target being insertable into the insertion portion, the connection portion connecting to the insertion portion in a direction intersecting an extending direction of the insertion portion, the pressing body capable of entering the connection portion,
wherein the clamping unit is attached to the bracket at the attachment portion.

* * * * *